United States Patent [19]

Saparzadeh

[11] Patent Number: 5,411,562
[45] Date of Patent: May 2, 1995

[54] TOPIARY WATERING SYSTEM

[76] Inventor: Daniel Saparzadeh, 1213 Milford, Houston, Tex. 77006

[21] Appl. No.: 97,980

[22] Filed: Jul. 27, 1993

[51] Int. Cl.⁶ .......................................... A01G 25/00
[52] U.S. Cl. ........................................ 47/58; 47/44; 47/4; 47/82
[58] Field of Search ............... 47/58.01, 82, 83, 62, 47/4, 44

[56] References Cited

U.S. PATENT DOCUMENTS

| | | | |
|---|---|---|---|
| 4,196,542 | 4/1980 | West | 47/4 |
| 4,268,994 | 5/1981 | Urai | 47/82 |
| 4,313,278 | 2/1982 | Pointing | 47/82 |

FOREIGN PATENT DOCUMENTS

| | | | |
|---|---|---|---|
| 2680626 | 3/1993 | France | 47/82 |
| 2636917 | 2/1978 | Germany | 47/82 |
| 3144356 | 1/1983 | Germany | 47/82 |
| 3624003 | 1/1988 | Germany | 47/82 |
| 3816866 | 11/1989 | Germany | 47/82 |
| 404293435 | 10/1992 | Japan | 47/62 |
| 2239155 | 6/1991 | United Kingdom | 47/82 |

Primary Examiner—Henry E. Raduazo
Attorney, Agent, or Firm—Browining, Bushman, Anderson & Brookhart

[57] ABSTRACT

The present invention provides an apparatus and method for maintenance of moisture level throughout a topiary. A plurality of fluid containers disposed at different vertical levels are mounted to a metal topiary frame. The containers each contain a wick that is used to transport fluid from the containers to topiary filler material which is bound to the metal topiary frame. Each container acts to passively regulate the level of moisture content in a region of the container through wick action. Ivy may be planted on the exterior surfaces of the topiary filler material, which may be a moss material.

18 Claims, 1 Drawing Sheet

TOPIARY WATERING SYSTEM

FIELD OF THE INVENTION

The present invention relates to a topiary watering system and, more particularly, relates to an apparatus and method for maintaining a sufficient moisture density within the body of the topiary to reliably support growth over the entire surface area of the topiary.

BACKGROUND OF THE INVENTION

Ornamental topiaries are utilized for decorative purposes in many home lawns and gardens, as well as public shopping malls, parks, and recreational centers. Topiaries may be formed using a metal frame in the general shape of a picturesque figurine or object. A large quantity of moss, such as sphagnum moss, may be tightly pressed into and about the metal frame. The moss may be bound to the topiary metal structure with wire or string, such as monofilament fishing line. Ivy or other suitable vegetation, selected for color and growth characteristics, is cultivated on the outside surfaces of the topiary, with the ivy roots penetrating the tightly bound moss. Topiaries may be of almost unlimited shape and design, and often will take geometrical forms or artistically depict animal or human figures.

Due to their various shapes and structure, topiaries present significant problems with respect to maintenance of sufficient moisture distribution throughout the entirety of the moss body. This problem is exacerbated for those topiaries located inside a building or mall, where normal garden watering procedures cannot be used without causing at least some risk associated with spilled or excess water on the floor. It is highly desirable for the entire exterior moss layer of the topiary to remain damp to promote root growth, so that the plant leaves on the exterior of the topiary remain healthy. However, there is a tendency for moisture to migrate to specific regions of the topiary or dissipate quickly from other regions. There is also a tendency for some regions of the topiary to dry more quickly due to wind, sun and/or high surface area per unit of moss. Concentration of the water will tend to promote exterior growth on some surface areas but will restrict growth in other areas. Where possible, regularly applied frequent soaking of the entire topiary will alleviate some of these problems. However, for administrative reasons or practical reasons relating to the location of the topiary, such frequent soaking is not always possible. It is also undesirable to spend a large amount of time maintaining the topiary moisture content.

Canisters containing a volume of water have been used in planter boxes to supply water through a wick to the soil in the planter. Planter boxes lose water mainly from the top surface, which is also the surface where growth is cultivated. Water loss typically occurs much more slowly in a planter box than in a topiary because of the greater density of the soil, and because the soil is not exposed to the atmosphere on all sides. Furthermore, the concentration of moisture in a lower part of the planter box is not a serious problem, because such concentration does not necessarily result in inadequate moisture to the vegetation at the top of the planter box. Excessive dripping which is likely to occur in a topiary generally does not occur in a planter box. Support for a canister in a planter box is typically provided by the lower layer of soil, and an upper soil layer is thus piled on the canister. Many topiaries do not utilize soil, and the moss cannot reliably support the canister.

There is a need to economically solve these watering problems associated with topiaries in a manner which is efficient, which ideally is applicable to topiaries maintained in both indoor and outdoor environments, and which maintains a level of moisture throughout the topiary sufficient to promote growth over the entire exterior surface of the topiary. Persons skilled in the art will appreciate the present invention solves or substantially alleviates these and other problems.

SUMMARY OF THE INVENTION

The present invention relates to a topiary watering system that includes a topiary frame formed using a plurality of interconnected metal cross-bar members having a desired configuration. A plurality of fluid containers are disposed at different vertical levels within the topiary and are mounted to and supported by the topiary frame. The containers each have an input port and an outlet port. Topiary filler material, such as sphagnum moss, is disposed within the frame for nourishment of plant roots, and forms an outer growing surface of the topiary. A fill pipe extends laterally outwardly and at least partially upwardly from the input port of at least one of the plurality of fluid containers through the moss to the exterior surface of the topiary. A plurality of wicks are each disposed into a respective one of the outlet ports of the plurality of fluid containers to transport fluid to the filler material of the topiary.

In operation, the fluid containers mounted within the topiary are filled with water through the fill pipe. The plurality of wicks slowly meter water from the fluid container to the filler material within the topiary at a flow rate substantially inversely related to the moisture content of the topiary filler material in the different regions of the topiary where the respective wicks are disposed. Vegetation then grows substantially over the entire surface of the topiary whereby the roots from the vegetation extend laterally inwardly from the topiary surface into the moist topiary filler material.

An object of the present invention is to provide an improved topiary watering system.

Another object of the present invention is to provide a system which maintains adequate moisture density throughout the topiary filler material to support growth on all sides of the topiary.

Yet another object of the present invention is to provide a passive watering system that automatically adjusts water flow rates to various portions of the topiary to compensate for some portions of the topiary which may dry more quickly than other portions.

A feature of the present invention includes fluid containers mounted onto the topiary framework at different vertical positions within the topiary.

Another feature of an embodiment of the present invention is a preferred ratio of topiary body volume to the volume of the fluid containers within that body volume.

An advantage of the present invention is the provision for moisture maintenance with a relatively infrequent watering cycle.

An additional advantage of the present invention is provision for moisture maintenance of an indoor topiary without the need for soaking the topiary in a manner that may result in an unsafe amount of water on the indoor flooring.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF PREFERRED EMBODIMENTS

The present invention provides a means for maintaining a sufficiently high level of moisture content throughout the topiary body so there is adequate moisture for vegetation to grow over the entire exterior surface of the topiary. The topiary watering system of the present invention is conveniently and inexpensively built into the topiary structure during manufacture of the topiary. The topiary watering system is preferably a passively regulating system with no moving parts that regulates water flow based on the level of moisture content in different regions of the topiary. Since some regions of the topiary will typically be more prone to drying than other regions, flow regulation according to this invention is helpful in maintaining a substantially consistent moisture content throughout the topiary body. It has been determined that the moisture content at the interior of the topiary body is important, even though the vegetation roots do not extend into this region.

Figure 1:
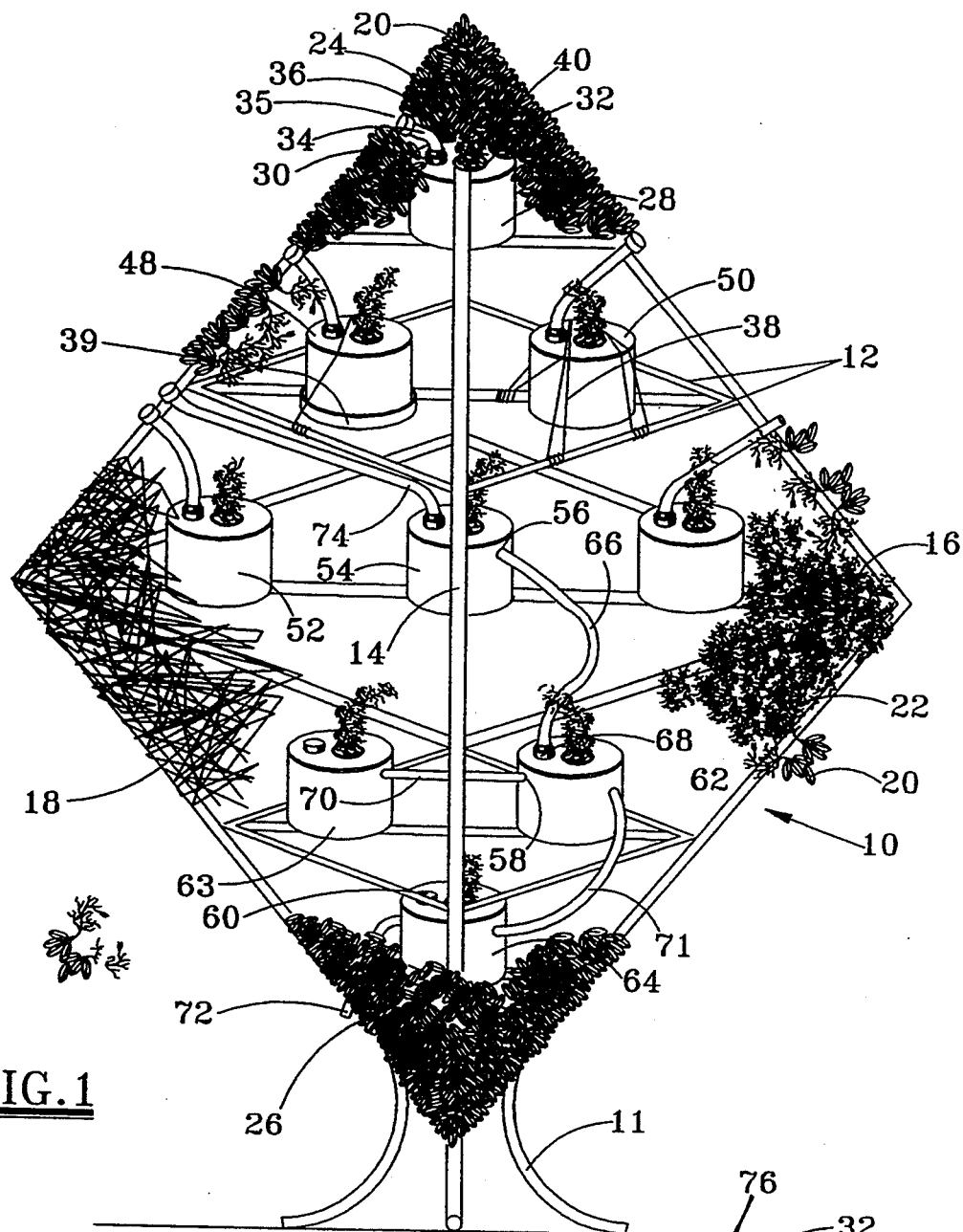
FIG. 1 is an elevational view, partially in section, of a topiary with a watering system in accord with the present invention.

Referring now to FIG. 1, there is seen a topiary 10 with a topiary watering system in accordance with the present invention disposed therein. Topiary 10 is supported by frame 12 comprised of cross-bar members, such as cross-bar member 14. The cross-bar members are preferably metallic, but may be formed from other suitably strong and preferably bendable materials. Frame 12 is formed into the approximate desired shape for the topiary, which may be in animal form, a geometric form, or a human form. Significant creativity and originality may go into the choice of the shape of the topiary. It should be understood that the topiary shown in FIG. 1 is relatively simple, and that most topiaries are not supported on a base 11 which is separate from the moss, but rather are supported on a base which desirably includes vegetation growth on all surfaces except the ground engaging or base surface.

Topiary filler material 16 is tightly packed into frame 12. Topiary filler material 16 is preferably a moss, such as sphagnum moss. The topiary filler material is bound tightly into a desired final shape of the topiary using wire 18. Vegetation 20 is planted over the surface of topiary 10. Roots 22 extend laterally into topiary 10 through filler material 16. Additional roots, such as upper roots 24 and lower roots 26, extend into topiary 10 from different directions. Without some type of regulation of water or frequent soaking of the topiary with water, it is quite likely that upper roots 24, lower roots 26 and side roots 22 will encounter significantly different moisture content within the moss body that, in some cases, may not be sufficient to maintain vegetation growth. Also, it may be understood that part of the moss-material topiary body could be too moist to maintain healthy growth of the vegetation. Because moss tends to expand with added moisture, the rate of fluid loss to the air may increase more quickly if the moisture content of the moss-material body drops below a certain level.

The watering system of the present invention substantially alleviates these problems. As well, the system is suitable for indoor applications, such as a covered mall or museum where a watering hose may not be conveniently available. The present watering system maintains moisture content over a fairly long period, depending on the size and number of fluid containers used, so that maintenance labor is greatly reduced.

Figure 2:
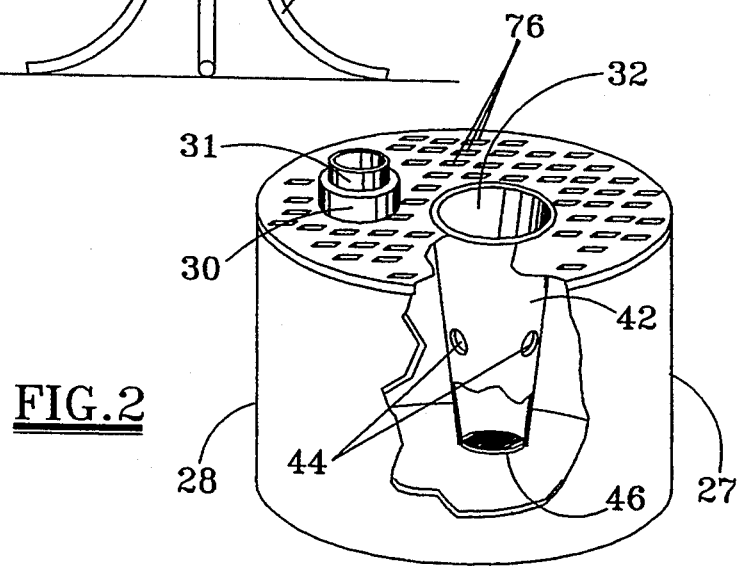
FIG. 2 is a pictorial view, partially in section, of a topiary fluid container in accord with the present invention.

The topiary watering system of the present invention preferably utilizes fluid canisters or containers such as fluid container 28 shown in the upper portion of topiary 10 and also in FIG. 2. Suitable containers may be purchased commercially which have an input port 30 and a wick port 32. For some preferred embodiments of the present invention, specialized containers may be built or modified. One such container is the MONA Plant System ™ container manufactured in Sweden. Fluid container 28 is preferably plastic, but may be made of other materials as desired.

Fill tube 34 extends from each container upwardly angled and extending laterally outward to exterior surface 36 of topiary 10. Fill tube 34 may be a plastic pipe, rubber hose, or other suitable material. Port 30 in each container preferably has a nipple or other connector means 31 for sealed and secure attachment to fill tube 34. The opposite or fill end of each tube may be provided with a removable cap 35. Fluid container 28 is preferably secured in place by binding the container with wire, such as wire 38, onto frame 12. Other mounting means, such as mounting bracket 39, may also be used. Mounting each fluid container 28 to metal frame 12 prevents movement, slippage, or tilting of fluid container 28 while topiary 10 is stuffed with filler material, and while the topiary 10 is transported from the manufacturer to the buyer, or is moved as desired by the buyer to different locations within a yard.

Fluid is preferably transferred from container 28 to topiary filler material 16 using wick 40, which comprises moss stuffed into and extending upward from the truncated cone member 42 shown in FIG. 2. Fluid flow rates using wick 40 will naturally increase when the region surrounding the container is drier or has a lower moisture content. Fluid flow will naturally decrease when the region surrounding the container has a higher moisture content. Thus, the present invention provides flow regulation which is inversely related to the level of water content in the region surrounding each container. Although various other materials may be used for the wick material, such as felt or textile materials, organic materials such as sphagnum moss is preferably used as the wick material.

Wick 40 is placed into the wick port 32 of fluid container 28 shown at the top of topiary 10 and also in FIG. 2. Port 32 preferably leads to truncated cone receptacle member 42 having a plurality of ports 44 for allowing water to pass between receptacle 42 and the generally cylindrical cavity within the container forward by sidewalls 27 of container 28. Screen 46 on the lower portion of the receptacle 42 supports the bottom portion of the wick in place while allowing water to pass upward into the receptacle 42. Wick holding receptacle 42 is preferably formed of plastic, but could also be formed of a wire mesh or other suitable materials.

One fluid container 28 may be disposed in an upper vertical level within topiary 10. Fluid containers 48 and 50 are located in a slightly lower level than fluid container 28. Fluid containers 52 and 54 are disposed on yet another level, and the remaining fluid containers are mounted at lower levels within the topiary 10. By distributing the fluid containers over different vertical levels and at various locations within one or more of the levels, the upper, lower and middle portions of the topiary are maintained with an adequate and relatively consistent level of water content. Each fluid container thus maintains the zone or portion of the topiary body around it with a sufficient level of water content. Because flow from the wick depends on the level of water content in each zone, the level of water content is passively regulated in each zone around each fluid container.

Preferably at least one fluid container, such as fluid container 54, is disposed substantially centrally within the topiary with respect to horizontal and vertical direction inside the topiary body. Maintaining a sufficient level of moisture in this central region around container 54 is particularly useful. When moist, the topiary filler material or moss in the central region around container 54 expands, and the expansion of the topiary filler material itself minimizes moisture loss from topiary 10.

Various piping connections are available for filling the fluid containers. Each container may have its own fill pipe 34 as shown in connection with fluid containers 28, 48, 50 and 54. Alternatively, it is possible to interconnect the fluid containers together so that two or even all fluid containers can be filled through one fill pipe. For this purpose, it is necessary to have a container output port, such as output ports 56, 58, and 60 shown on fluid containers 54, 62, and 64, respectively. The fluid containers thus fill to the level of the output port and then begin to spill over into the port to the lower fluid container. Interconnection pipe 66 accordingly connects output port 56 to input port 68 in order to interconnect a relatively higher vertical fluid container 54 with the lower vertical level container 62. When fluid container 62 fills, then pipe 70 transfers the fluid to fluid container 63, which is at the same vertical level as fluid container 64 but in a different horizontal position. Pipe 71 simultaneously transfers water from container 62 to lower container 64.

Water may flow out of container 64 through indicator overflow pipe 72 to indicate when all three fluid containers are full. Alternatively, if there is no indicator overflow pipe, water will eventually back up fill pipe 74 to indicate that all fluid containers are full. As well, if there is no output pipe, then the interconnection pipes add storage capacity to the system. In some cases, slots 76 may be place on the tops of the fluid containers so that overflowing water from the fluid containers goes directly out of the container to provide a quick but orderly soaking that may be preferably to the rather slow but regulated flow from the wick.

In a preferred embodiment of the present invention, it is generally desirable to have about one fluid container (with this explanary container having a volume for holding water of approximately 0.3 cubic feet) for each 2.5 cubic feet of topiary body. Expressed differently, the ratio of the fluid volume of the one or more fluid containers to the volume of the topiary body (including the moss, the metal frame, and volume of the fluid container), should be from about 1:12 to 1:5, and preferably about 1:8. The spacing and amount of fluid containers can be changed to accommodate expected variations in ambient conditions, e.g., very high or very low relative humidity. Also, it may be desirable to have different spacings for indoor topiaries as opposed to topiaries intended for outdoor display.

The foregoing disclosure and description of the invention is intended only to be illustrative and explanatory of presently preferred embodiments of the invention. It will be appreciated by those skilled in the art that various changes in the size, shape and materials, as well as in the details of the illustrated construction or combinations of features, may be made without departing from the spirit of the invention.

What is claimed is:

1. A method of regulating fluid flow to maintain a desired moisture content to a topiary, comprising:
   forming an openwork support frame of rod-like members enclosing an open central volume;
   positioning a plurality of fluid containers at different vertical levels in said open central volume each supported by said support frame such that each fluid container is disposed in a different region of said support frame;
   filing said support frame with a topiary filler material outward of each of the fluid containers, such that exposed exterior surfaces of the filler material define exterior surfaces of the topiary and the filler material encloses each of said fluid containers;
   filling each of said plurality of fluid containers within said topiary with fluid;
   positioning a wick in engagement with the fluid within each of the respective containers at one end and inside the topiary of its other end for conveying fluid from each of said plurality of fluid containers to said filler material within respective ones of said different regions of said topiary; and
   growing vegetation over the exterior surface of the topiary, whereby the roots of said vegetation extend inwardly from said exterior surface into said filler material to contact said water conveyed from said plurality of fluid containers.

2. The method as defined in claim 1, wherein the step of growing vegetation further comprises:
   growing vegetation on a lower exterior surface of said topiary such that roots from said vegetation extend substantially upwardly from said lower surface of said topiary into said filler material; and
   growing vegetation on an upper exterior surface of said topiary such that roots from said vegetation extend substantially downwardly from said upper surface of said topiary into said filler material.

3. The method as defined in claim 1, wherein the step of positioning the plurality of fluid containers comprises:
   positioning one or more of the plurality of containers at an elevation within the support frame such that a lower portion of each of said one or more of the plurality of containers is higher than an upper portion of others of the plurality of containers within the support frame.

4. The method as defined in claim 1, further comprising:

arranging said plurality of fluid containers within said topiary to provide a moisture content throughout said topiary filler material sufficient to grow said vegetation over substantially the entire exterior surface of said topiary.

5. The method as defined in claim 1, further comprising:
fixedly securing each of said plurality of fluid containers to said support frame.

6. The method as defined in claim 3, further comprising:
providing a ratio of from 1:12 to 1:5 for the volume of the plurality of fluid containers compared to the volume of the topiary.

7. The method as defined in claim 6, wherein the step of providing a ratio comprises providing a ratio of about 1:8 for the volume of the plurality of fluid containers compared to the volume of the topiary.

8. The method as defined in claim 1, further comprising:
providing a filler tube extending from said exterior surface of said topiary to at least one of said plurality of fluid containers to fill said at least one of said plurality of containers.

9. The method as defined in claim 8, further comprising:
positioning said filler tube inlet adjacent said exterior surface of said topiary at a position lower than an uppermost exterior surface of said topiary.

10. The method as defined in claim 1, wherein the step of positioning the wick includes conveying fluid out of each of said plurality of fluid containers at a rate substantially inversely related to the level of moisture content within each of said respective different regions of said topiary, such that fluid flow is relatively faster when the level of moisture content is relatively low and fluid flow is relatively slower when the level of moisture content is relatively high.

11. A method of manufacturing a topiary, comprising:
forming a metallic support frame substantially into a desired shape of said topiary, the support frame forming an openwork support frame of rod-like members enclosing an open central volume;
positioning one or more fluid containers within said open central volume each supported on said metallic support frame;
providing a fill pipe to at least one of said one or more fluid container, at least one of said fill pipes extending laterally outwardly to an exterior surface of said topiary;
placing a wick in each of said one or more fluid containers;
installing moss filler material within said metallic support frame and in engagement with an upper end of each of said one or more wicks;
installing moss filler material outward of each of the fluid container such that an exposed exterior surface of the installed filler material defines an exterior surface of the topiary and encloses each of said fluid containers;
binding said moss filler material to said metallic support frame with wire; and
repeatedly adding water to each of said one or more fluid containers within said topiary to provided a moisture content throughout said moss filler material sufficient to grow said vegetation over substantially the exterior surface of said topiary.

12. The method as defined in claim 11, wherein said one or more fluid containers include a plurality of fluid containers, and wherein the step of positioning the plurality of fluid containers comprises:
positioning one more of the plurality of containers at an elevation within the support frame substantially higher than others of the plurality of containers within the support frame.

13. A method of regulation fluid flow to maintain a desired moisture content to a topiary, comprising:
forming an openwork support frame of rod-like members enclosing an open central volume;
positioning a plurality of fluid containers at different vertical levels each supported by said support frame in said open central volume such that each fluid container is disposed in a different region of said topiary frame;
filling said topiary frame with a topiary filler material outward of each of the fluid containers, such that exposed exterior surfaces of the filler material define exterior surfaces of the topiary which cover each of said fluid containers;
providing a ratio of from 1:12 to 1:5 for the volume of the plurality of fluid containers compared to the volume of the topiary;
providing a filler tube extending from said exterior surface of said topiary to at least one of said plurality of fluid containers to fill said at least one of said plurality of containers;
filling each of said plurality of fluid containers within said topiary with fluid;
positioning a wick in engagement with the fluid within each of the respective containers at one end and inside the topiary of its other end for conveying fluid from each of said plurality of fluid containers to said filler material within respective ones of said different regions of said topiary; and
growing vegetation over the exterior surface of the topiary, whereby the roots of said vegetation extend inwardly from said exterior surface into said filler material to contact said water conveyed from said plurality of fluid containers.

14. The method as defined in claim 13, wherein the step of growing vegetation further comprises:
growing vegetation on a lower exterior surface of said topiary such that roots from said vegetation extend substantially upwardly from said lower surface of said topiary into said filler material; and
growing vegetation on an upper exterior surface of said topiary such that roots from said vegetation extend substantially downwardly from said upper surface of said topiary into said filler material.

15. The material as defined in claim 13, wherein the step of positioning the plurality of fluid containers comprises:
positioning one or more of the plurality of containers at an elevation within the support frame such that a lower portion of each of said one or more of the plurality of containers is higher than an upper portion of others of the plurality of containers within the support.

16. The method as defined in claim 13, further comprising:
arranging said plurality of fluid containers within said topiary to provide a moisture content throughout said topiary filler material sufficient to grow said vegetation over substantially the entire exterior surface of said topiary.

17. The method as defined in claim 13, wherein the step of providing a ratio comprises providing a ratio of about 1:8 for the volume of the plurality of fluid containers compared to the volume of the topiary.

18. The method as defined in claim 13, wherein said exterior surface of said topiary which receives said filler tube is lower than an uppermost exterior surface of said topiary.

* * * * *